United States Patent

Cherian et al.

[11] Patent Number: 5,930,497
[45] Date of Patent: Jul. 27, 1999

[54] METHOD AND MEANS FOR GENERATION OF REALISTIC ACCESS PATTERNS IN STORAGE SUBSYSTEM BENCHMARKING AND OTHER TESTS

[75] Inventors: Neena A. Cherian, San Jose; Bruce McNutt, Gilroy, both of Calif.

[73] Assignee: International Business Machines Corporation, Armonk, N.Y.

[21] Appl. No.: 08/988,438

[22] Filed: Dec. 11, 1997

[51] Int. Cl.[6] .................................................. G06F 12/02
[52] U.S. Cl. ............................................................ 395/500
[58] Field of Search ................................ 711/4; 395/500

[56] References Cited

U.S. PATENT DOCUMENTS

| | | | |
|---|---|---|---|
| 4,207,609 | 6/1980 | Luiz et al. | 395/858 |
| 4,463,424 | 7/1984 | Mattson et al. | 395/463 |
| 5,086,386 | 2/1992 | Islam | 395/600 |
| 5,379,422 | 1/1995 | Antoshenkov | 707/1 |

OTHER PUBLICATIONS

D. Thiébaut et al., "Synthetic Traces for Trace–driven Simulation of Cache Memories", *IEEE Transactions on Computers*, vol. 41, No. 4, Apr. 1992, pp. 388–410.

Primary Examiner—Kevin J. Teska
Assistant Examiner—Hugh Jones
Attorney, Agent, or Firm—R. Bruce Brodie

[57] ABSTRACT

A method and means for emulating realistic access requests used in static or dynamic performance testing of a disk-based storage subsystem. The method and means are based on the fact that a test driver can substitute for an actual application if an executing process generates a pattern of accesses to disk subsystem addresses as a prescribed random walk function among a cluster of contiguous tracks associated with the process. The access pattern will emulate both locality of referencing and the fact that the likelihood of rereferencing the same track varies inversely over time.

14 Claims, 6 Drawing Sheets

TEST GENERATOR CONTROL FLOW EMULATING ADDRESS LOADING PER APPLICATION WITH LOCALITY OF REFERENCING

CONTEXTUAL SITING OF A SHARED DISK STORAGE
SUBSYSTEM UNDER REAL MULTI-CPU AND
MULTIPROCESSING ACCESS LOADS

CONFIGURATION OF READ/WRITE DRIVER AND TEST GENERATOR AND THE STORAGE SUBSYSTEM

TEST GENERATOR CONTROL FLOW EMULATING ADDRESS LOADING
PER APPLICATION WITH LOCALITY OF REFERENCING

*FIG. 2B*

RANDOM SELECTION OF NEXT ADDRESS FROM
SUBSET SUBTENDING TARGET NODE

*FIG. 2C*

REGIONS OF CONTIGUOUS TRACKS ASSIGNED
TO DIFFERENT EXECUTING PROCESSES

*FIG. 3*

IMPLICIT DISK TRACK BINARY ADDRESS TREE
ASSOCIATED WITH A PROCESS

P(R/R) = K/T CONDITIONAL PROBABILITY OF REREFERENCING OF A GIVEN TRACK BY THE SAME APPLICATION - WHERE K IS A CONSTANT OF PROPORTIONALITY AND T IS THE TIME SINCE THE LAST REFERENCE

FIG. 6

METHOD AND MEANS FOR GENERATION OF REALISTIC ACCESS PATTERNS IN STORAGE SUBSYSTEM BENCHMARKING AND OTHER TESTS

FIELD OF THE INVENTION

This invention relates to the generation of read and write requests by one or more tasks or applications executing on one or more processors where the requests are applied to a shared or common storage subsystem. More particularly, the invention relates to methods and means for the generating of realistic patterns for use as a driver source in static or dynamic performance testing of storage subsystems or the like.

DESCRIPTION OF RELATED ART

The following paragraphs raise some of the foundation issue in testing of information handling systems, and especially disk-based storage subsystems. The discussion of the art ends with a review of some of the shortfalls of using a large system configuration to provide realistic patterns of reads and writes in exercising a storage subsystem as a test subject.

Information Handling Systems and Benchmark Testing

How can a complex information handling system (IHS) made by one manufacturer be fairly compared to a similar IHS from a second manufacturer? Is there a way in which an IHS can dynamically test itself to determine whether it is in good performance health? These are questions of testing. However, the testing of systems having complex behaviors and comparing one system to the other, or even comparing a system's behavior against itself, has been considered as much of an art as a science.

There are some aspects that all IHS testing has in common, namely, each test includes a purpose, object, method, and result. A test has to have a purpose such as a mechanical wear test, a shock and vibration test, a performance test, a reliability or availability test, etc. In contrast, a test object is the entity being stressed or perturbed and measured. Typically, test objects include disk drive storage devices, a disk storage subsystem, or a CPU interacting with a storage subsystem. Relatedly, the test method or protocols are algorithm-like directives as to the manner and mode by which specific entities are perturbed and the responses measured. Lastly, the results are derived from the analysis of the measurements, including error and causal interpretation.

A benchmark test is a test that uses a representative set of programs and data designed to evaluate the performance of an IHS in a given configuration. Benchmark tests for hardware use programs that test the capabilities of the equipment. One frequent test attribute of a processor is measuring the speed at which a microprocessor can execute instructions or handle floating-point numbers. Benchmark tests for software determine the efficiency, accuracy, or speed of a program in performing a particular task, such as recalculating data in a spreadsheet. The same data is used with each program tested so the resulting scores can be compared to see which programs perform well, and in what areas. The design of fair benchmarks is something of an art because various combinations of hardware and software can exhibit widely variable performance under different conditions. Often, after a benchmark has become a standard, developers try to optimize a product to run that benchmark faster than similar products run it in order to enhance sales.

One illustration of benchmark testing used for tuning a desk-based personal computer system may be found in Islam, U.S. Pat. No. 5,086,386, "Method and Apparatus for Benchmarking the Working Set of Window-based Computer Systems", issued Feb. 4, 1992.

Some Aspects of Storage Subsystems

A disk storage subsystem comprises one or more cyclic, tracked, magnetic or optical storage devices. It further comprises a large subsystem cache, and means for staging or destaging units of storage between the devices and the subsystem cache and between the cache and applications executing on program-responsive entities (CPU). Each executing application periodically or opportunistically generates read or write requests for a named unit of data to the CPU resident operating system (OS) at a virtual or logical address.

If the requested data is not stored in the CPU main memory, then the data must be acquired externally. The operating system, in turn, interprets the request to access the named data according to a model of external attached subsystem storage. For instance, the access method portion of an MVS operating system running under the IBM S/390 CPU processes read and write requests as if the data were stored oil tracks of IBM 3390 disk drives or their emulated equivalent.

The access method responsive to a read request causes a path to the named data to be made either to the subsystem cache or to the storage device track itself. For a fast write request, the logical address and the named data are sent by the access method to the storage subsystem and entered into a cache and nonvolatile store (NVS). The subsystem signals a completion of the operation to the CPU and asynchronously writes out the unit of storage to the disk devices.

Establishing a path to data involves rendering a control and a physical path connection between the data source and the data sink. In this regard, determining the location or address of the named data in the storage subsystem is a major subsystem activity. When new data is first written out to the subsystem, a new track (cylinder), disk, and sector address must be assigned and various dictionaries, catalogs, and tables updated. When previously recorded data is to be read and is not available in subsystem cache or old data is recently modified, then data is respectively copied and staged from a previously assigned disk track location to the cache or written out from NVS or cache and updated in place at the assigned disk location.

At a subsystem level, all data is stored at a logical address. This permits the CPU operating system to read and write named data to a logical or virtual space in an assumed model of external storage. It further permits the disk subsystem to map the logical or virtual space to yet another logical space if that is necessary. Ultimately, all of the named data must be mapped to a real space address on the tracks of one or more of the disk drives.

In this specification, the terms "access request" and "referencing" connote one or more commands and operands emanating from a source external to the storage subsystem and sent to the storage subsystem. The commands are interpreted by the subsystem as either causing space to be newly allocated in the subsystem for a newly-named unit of data (format write), modified named data to be updated in place (write), or named data to be staged to the requesting source (read).

Storage Subsystems Locality of Referencing and Performance Testing

One of the distinctions of disk-based storage subsystems resides in the fact that data is either streamed to or from the subsystem and disk devices. Another distinction relates to the limited instruction repetoir to which it is subject, namely, access commands and address operands, read or write commands, format commands, etc. However, it is well known that performance can be significantly affected by groups of these factors. Presumptively, performance testing should elucidate the factors and their effects on a system.

It should be appreciated that related named units of data are frequently recorded in proximity to one another on the same or contiguous tracks or the like. If files x+1, x+2, x+3, etc. were recorded sequentially on the same track or contiguous tracks, then this clustering would reduce latency for both sequential and random referencing. That is, the time and distance in repositioning the access arms in the disk drives would be reduced. The clustering of read and write requests refers to the referencing and rereferencing of the same addresses within a short period of time. This is independent of recording units of data on the same or contiguous disk tracks. In this regard, a large fraction of the random references in each executing application are rereferences to the same data or related data. This tendency of rereferencing only a small fraction of the available stored data is termed "locality of referencing". This property is relied upon in the design of subsystem caches and the like.

In the prior art, performance testing of large capacity, disk-based storage subsystems has involved a complex database such as IMS or DB2 installed on a host and on the storage subsystem being tested. Additionally, the database was populated with some actual or live data. Some representative host-based applications were then run against the database to generate various patterns of referencing. This disadvantageously requires a host with sufficient capacity to manage many operations. These include operating the large database, executing applications against the database, and monitoring the results.

Performance of any storage subsystem varies as a function of the patterns of referencing. That is, references may be random or sequential or intermixed runs of both. The patterns may exhibit locality with an occasional branch to another addressing region. It is believed that reference patterns exhibiting degrees of locality occur most frequently.

The prior art is typified by Mattson et al., U.S. Pat. No. 4,463,424, "Method for Dynamically Allocating LRU/MRU Managed Memory Among Concurrent Sequential Processes", issued Jul. 31, 1984. Mattson discloses that a hit ratio for an LRU-managed cache is a function of depth and size allocated to each referencing process. A similar proposition was also expressed later by Dominique Thiebaut et al., "Synthetic Traces for Trace-driven Simulation of Cache Memories", *IEEE Transactions on Computers*, Vol. 41, No. 4, April 1992, pp. 388–410. In his paper, Thiébaut describes a method for generating a pattern of addresses for read and write requests. This pattern is directed to units of data stored in a least-recently-used (LRU) managed cache. The LRU cache list is maintained to a predetermined depth distribution. Thus, a desired cache hit ratio can be achieved by tuning the address references and rereferences for a given depth.

SUMMARY OF THE INVENTION

It is accordingly an object of this invention to devise a method and means for emulating the generation of realistic access patterns in storage subsystem benchmarking and sundry test purposes.

It is yet another object to devise a method and means that realistically approximate the access patterns from a plurality of concurrent referencing sources for data stored on cyclic, tracked storage devices or staged in any subsystem caches intermediate to the devices and the sources.

It is a further object that said method and means be suitable for dynamic as well as static performance testing of a storage subsystem and without the use of database software.

The above objects are believed satisfied by a method and means for emulating realistic access requests used in static or dynamic performance testing of a disk-based storage subsystem. The invention is based on the fact that a test driver can substitute for an actual application if an executing process generates a pattern of accesses to disk subsystem addresses as a constrained random walk function among, a cluster of contiguous tracks associated with the process. The access pattern will emulate both locality of referencing and the fact that the likelihood of rereferencing the same track varies inversely over time where the random walk is constrained on an address tree by a Bernoulli experiment.

This behavior is secured by considering that the track addresses associated with each process are an ordered set. In addition, the addresses constitute the leaves of an implicit address tree. Although each successive address is a randomized function of its predecessor address, it is constrained by requiring a traverse up the tree from the old address and randomly choosing the next address from the group of addresses (leaves) subtending the target node. The height of the traverse (number of connected nodes) can be either a fixed number or the result of a Bernoulli (chance) experiment. The latter case will enhance the random variation.

More particularly, the method of this invention involves associating a nonexclusive region of disk storage of a predetermined number of contiguous addressable tracks to each executing process. Each region implicitly defines an ordered set and further constitutes an implicit binary address tree in which the leave s are the track addresses. Next, a starting address is assigned among the region track addresses responsive to a first access request from each accessing process. In this regard, the starting address is one selected from the set consisting of an arbitrary address and a randomly selected address.

As each process generates an access (read or write) request, the next address is assigned to the request as a result of executing a random walk function starting from an immediate predecessor address. This random walk processing includes traversing at least one node to a target node in the binary tree in a leaf-to-root node direction. Each traverse involves moving up at least one node and performing a Bernoulli experiment resulting in one of two outcomes. The traverse and the experiment are repeated for at least one more node as the target node, upon the occurrence of an outcome of a first kind such as the generation of a pseudorandom number, exceeds a threshold. If an outcome of the second kind results, such as the generation of a random number less than the threshold, then an address from the address subset subtending the target node is randomly selected. This process for address determination is repeated for each request from each process.

DESCRIPTION OF THE PREFERRED EMBODIMENT

Performance Testing Operating Points and Realistic Loads

There are several different views of performance tests. One view holds that the performance operating point of a system is best determined by maximally stressing one or more parameters. Another view holds that performance operating point is best gauged by applying a so-called realistic series of loads on the system and measuring the response without inflicting maximal stress. This invention is directed to emulating realistic loads from one or more executing applications by providing a pattern of addresses for each application that provides degrees of locality of referencing and randomized accessing.

Typical Large System Site and Attached Storage

Figure 1:
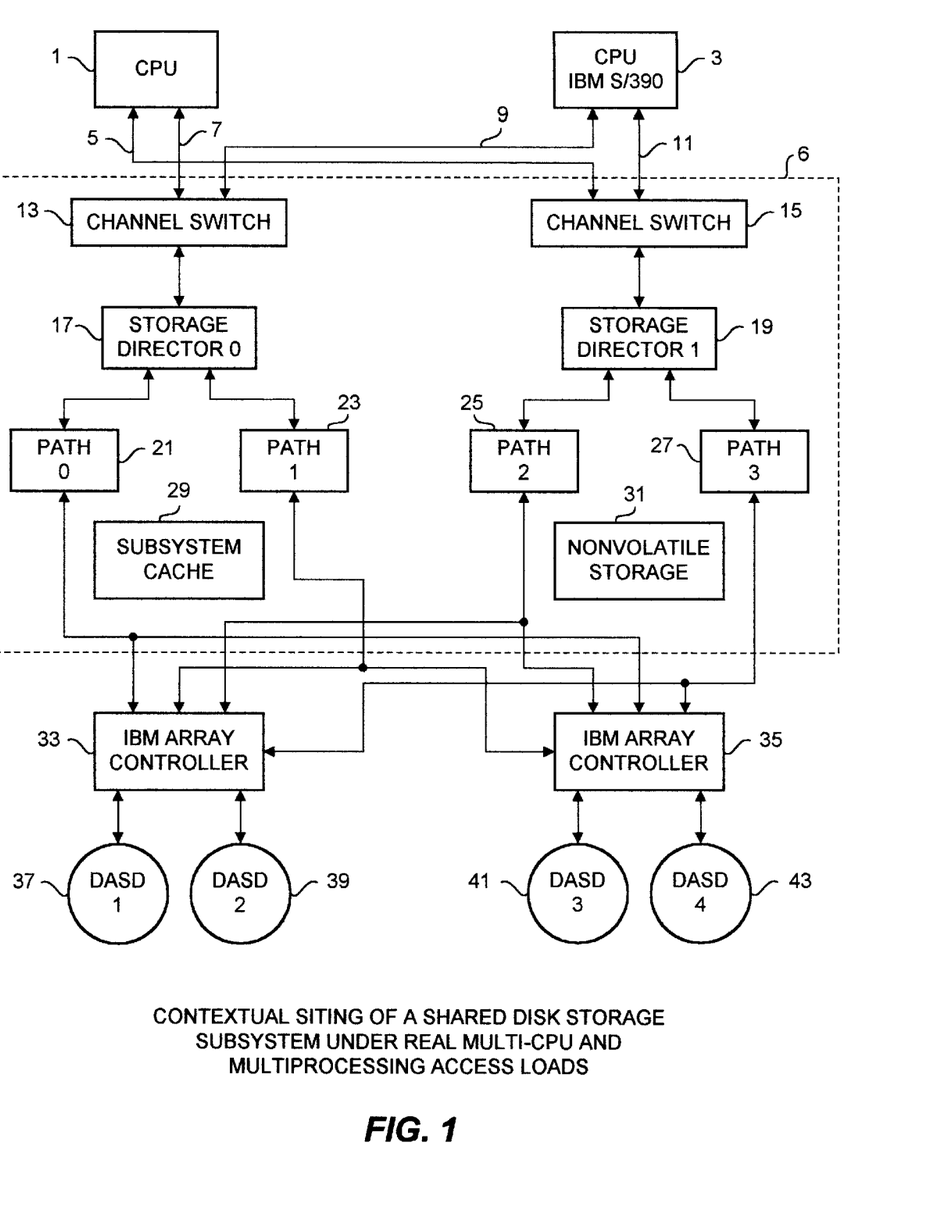
FIG. 1 depicts a typical configuration of a pair of multi-processing CPUs accessing a shared disk-based storage subsystem according to the prior art.

Referring now to FIG. 1, there is shown a typical configuration of a pair of multiprocessing CPUs 1, 3 accessing a shared disk-based storage subsystem 6 according to the prior art.

The disclosed arrangement comprises an IBM 3990/3390 disk storage subsystem exemplifying a host-attached, hierarchical, demand/response storage subsystem. This subsystem is shown driven from first and second multiprogramming, multitasking host CPUs 1 and 3, such as an IBM System/390 running under the IBM MVS operating system. The subsystem is designed such that data stored on any of the DASD storage devices 37, 39, 41, and 43 can be accessed over any one of at least two failure-independent paths from either one of the CPUs 1 or 3, although the system as shown provides four failure-independent paths. Illustratively, data on devices 37 or 39 can be reached via 3390 controller 33 over any one of paths 21, 23, 25, or 27. The same holds for data stored on devices 41 or 43 via controller 35. A full description of this architecture can be found in Luiz et al., U.S. Pat. No. 4,207,609, "Method and Means for Path Independent Device Reservation and Reconnection in a Multi-CPU and Shared Device Access System", issued Jun. 10, 1980, incorporated herein by reference.

Such subsystems also include a read/write cache 29. This cache LRU manages read references and is the initial repository for all write updates. However, when a "fast write" feature is implemented, any updates are copied over to a nonvolatile store 31, a completion signal is sent to the host, and the updates are written out to disk from NVS 31 asynchronously.

In the prior art, in order to perform benchmark tests, the configuration shown in FIG. 1 would be loaded with a large software database, such as IMS or DB2, exercising the attached subsystem 6 by running read and write requests in the database mode. Unfortunately, every time there was a change in the subsystem, such as by replacing IBM 3390 disk drives with drawers of RAID 5 disks, an inordinate amount of time would have to be devoted to the reconfiguration and tuning of the database.

In the FIG. 1 configuration, each CPU 1, 3 is capable of executing many applications and tasks on a concurrent basis. Each CPU generates a sequence of intermixed random and sequential reads and writes. These are communicated to the storage director 17 or 19 over a respective one of the paths 5, 7, 9, or 11 through a counterpart channel switch 13 or 15. It should be appreciated that this configuration includes at least two paths to each one of the disk drives 37, 39, 41, and 43 so that the failure of any single path element will not block ultimate access to the disk drive. Thus, each of the path interfaces 21, 23, 25, and 27 cross-couples each of the storage directors 13 and 15 to each of the disk drives.

It has been well recognized that in order to ascertain the behavior of the subsystem, it is necessary to follow the number of references, their type, address in storage, and both the system response and time of occurrence for each application. As a minimum of recordkeeping, each read and write reference forms part of a log and includes the process name, application or task, the time of issuance of a read or write request, address, and time of completion. A discussion of traces and logs can be found in Mattson '424 supra. From such statistics, hit and miss ratios, latency, and times between occurrences of the same or similar incidents can be determined.

Test Generator for Driving a Storage Subsystem

Figure 2A:
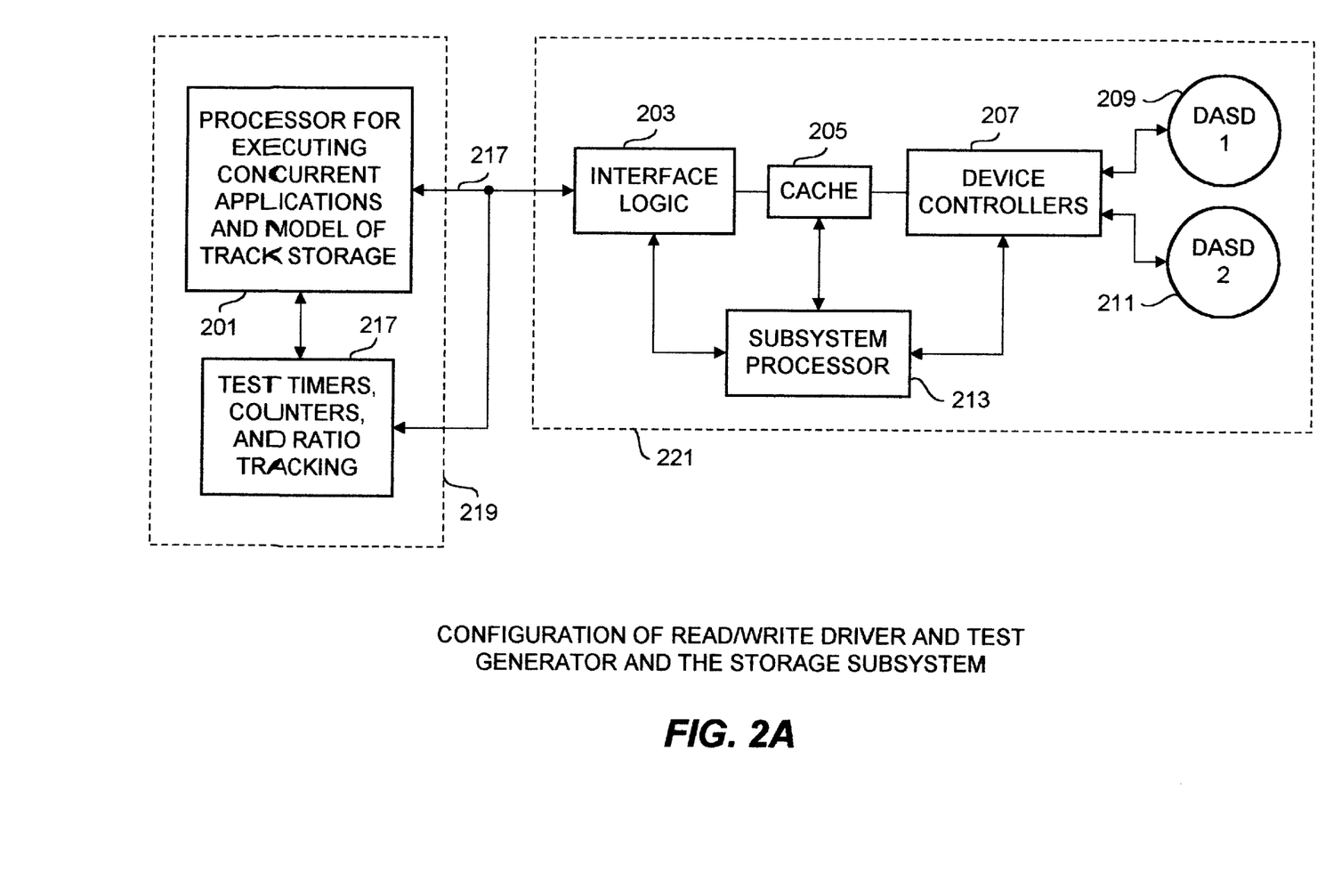
FIG. 2A illustrates the relationship between a load generator/driver and the disk subsystem under test.

Referring now to FIG. 2A, there is shown the relationship between a load generator/driver 219 and the disk subsystem 203 under test. In this arrangement, the driver 219 would comprise any processor of sufficient instruction speed and capacity to invoke and task switch among two concurrent applications and test event recorders 217 and the like. Most of the tracking of the read and write operations, including address substitution and modification, can be performed at the host site. That is why the timers and counters 217 are shown coupled to the main processor subsystem communications path 215. If the virtual and real storage models are substantially the same, then real address modification and tracking could also be performed at the host.

It should be noted that this invention is not directed toward improvements in event counting and other forms of performance test reportage. It is expected that the skilled artisan would utilize the standard process activity tracking and logging facilities resident at both a driver host and the subsystem being tested. See again the above-mentioned Mattson '424 patent.

Any disk-based storage subsystem 203 under test would generically comprise a plurality of tracked disk drives 209, 211. Read and write requests would be passed from processor 201, after being duly noted, and logged event recorders 217 through the subsystem interface logic 204 to subsystem processor 213 where they would be interpreted. If the subsystem under test has a large read/write cache 205, then a significant fraction of the testing in fact will be a test of the organization and management of the subsystem cache. For tracks not available in cache, the subsystem processor will stage them up from the disk drives or write out updates to the disks 209 and 211. The monitoring of subsystem cache performance can be programmed to be conducted at the subsystem processor 213 or can be inferred inferentially.

Generation of Disk Track Addresses as a Random Walk Function

In this protocol, the term "random" is used in two independent and distinct circumstances. Firstly, the term is used as a mode of deciding whether to continue traversing another node in a graph. To avoid confusion, this usage is denoted as a "Bernoulli experiment". Secondly, the term connotes a selection of one address among a number of addresses in the same subset.

A random walk is defined as a route or a traverse of successive steps in which each step is chosen by a random function uninfluenced by any previous step, except the starting point. The starting point for determining the next step is the last previous step. By constraining the traverse to an address tree, the likelihood that the next address will exhibit some locality of reference, including rereferencing the same track address, varies approximately inversely over time. This result is not the same as would pertain from merely a continuous and unconstrained random selection from among all of the track addresses.

Figure 3:
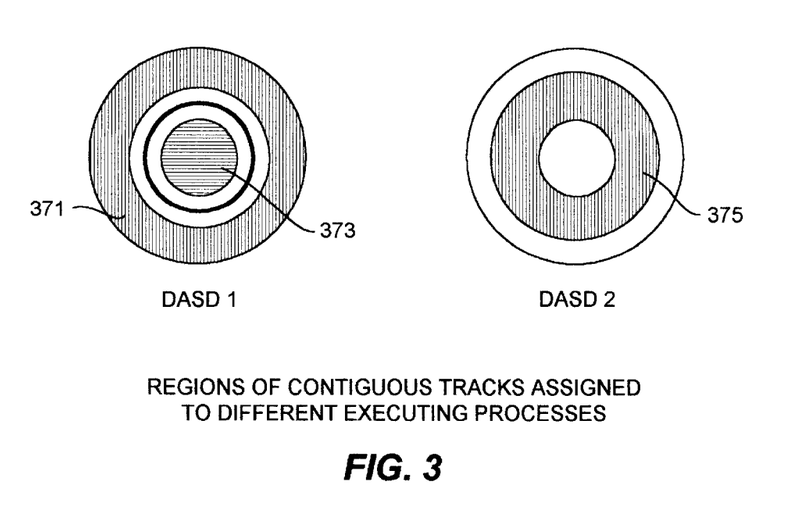
FIG. 3 depicts a pair of multitracked storage disks with contiguous tracks allocated to different processes.

Referring now to FIG. 3, there is shown a pair of multitracked storage disks with contiguous tracks allocated to different processes. In this embodiment, each process executing at the test driver processor 201 in FIG. 2 is assigned a region of $2^N$ contiguous tracks nonexclusively. Any given process when executing selects relatively addressed tracks $0 \leq L_j \leq 2^N-1$; j=0, 1, 2 from its region for incorporation into its read and write requests. The first track $L_0$ is selected arbitrarily or randomly from ihe region assigned to that process. Each subsequent track $L_j+1$ is selected as a randomized function of its preceding track $L_j$.

Current recording practices are to record data at constant densities such that the number of recorded bytes/inch per inner track 373 of DASD 1 is the same as the number of recorded bytes/inch on outer track 371. Thus, if it were desired to allocate approximately equal capacity regions, then the number of tracks bound to each process might vary. Alternatively, two or more processes might be assigned either overlapping regions or the same region.

Figure 4:
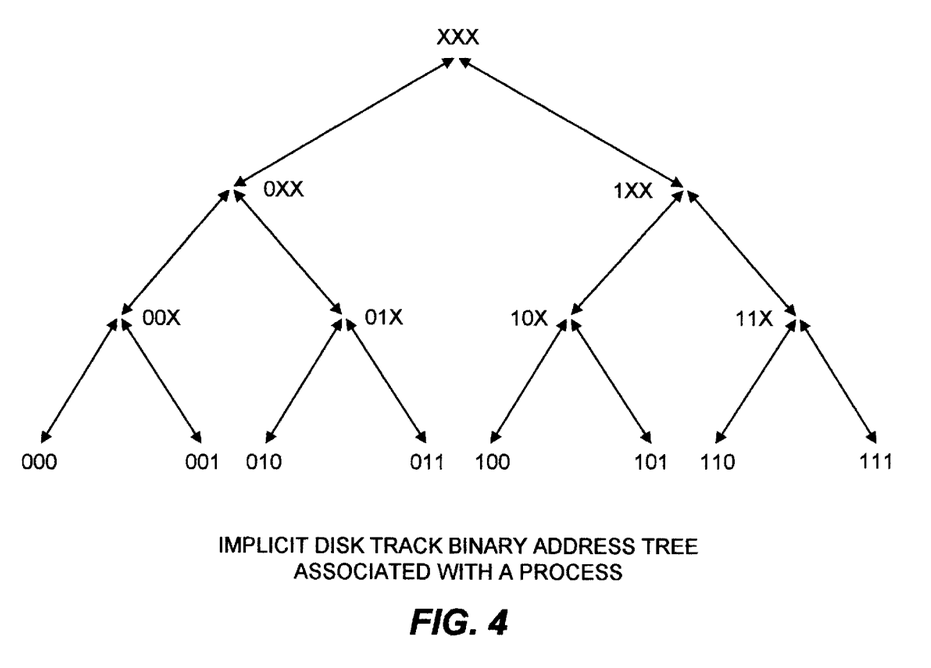
FIG. 4 illustrates an implicit binary address tree of contiguous disk tracks associated with an executing process.

Referring now to FIG. 4, there is shown an implicit binary address tree of contiguous disk tracks associated with an executing process. Suppose the assigned region were sized at $2^N$=8 tracks. The tracks are relatively addressed from 000, 001, . . . , 111, and when considered as an ordered set supports an implicit address tree.

If a process first referenced or started at address 101, then the address assigned to its next read or write request would be a randomized function of the immediately preceding address. This is brought about by starting from the last address, 101, and traversing to a parent node 10X and performing a Bernoulli experiment.

A Bernoulli experiment is defined to be any random experiment having well-defined outcomes to which an event is attached. One example of a Bernoulli experiment is a simple coin toss with heads or tails as possible outcomes. Another example is a random number generation being less than or greater than a predetermined or threshold value.

In this case, one outcome causes a traverse to be made to the next parent node labeled 1XX. The other outcome is to randomly select a leaf (track address) from the set subtending that node, namely, 100 or 101. If the first outcome prevailed and the traverse was made to the node 1XX, then another Bernoulli experiment would be conducted. If, as a consequence of the second Bernoulli experiment, the second Cutcome prevailed, then the next address would be from the set of leaves subtending 1XX. These are {100, 101, 110, 111}. In this protocol, the traverse stops at the root node or if a predetermined number of nodes have been traversed and the next address has been selected from the subtending nodes. In FIG. 4, the latter circumstance of traversing to the root node would result in selecting the next address from the entire set {000, 001 . . . 111}.

Figure 5:
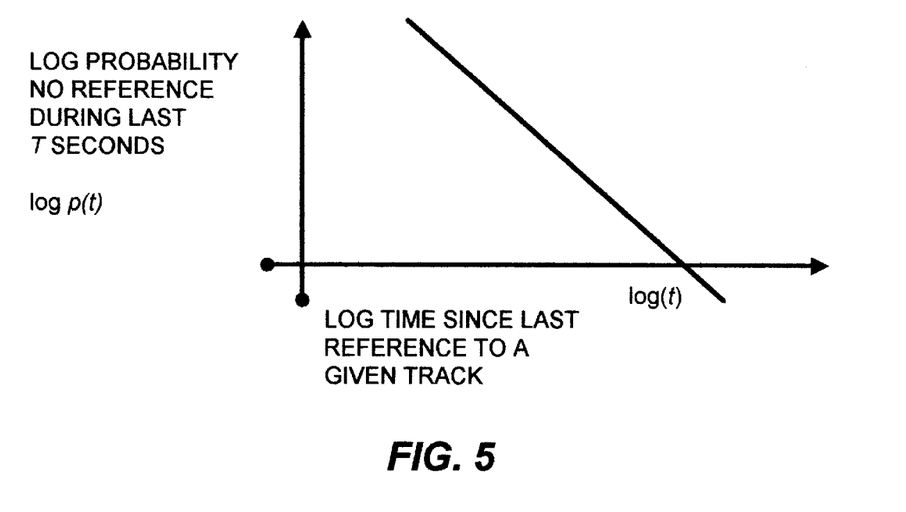
FIG. 5 sets forth a log-log plot of the inverse relation between the probability of rereferencing as an inverse function of time since the last reference.
Figure 6:
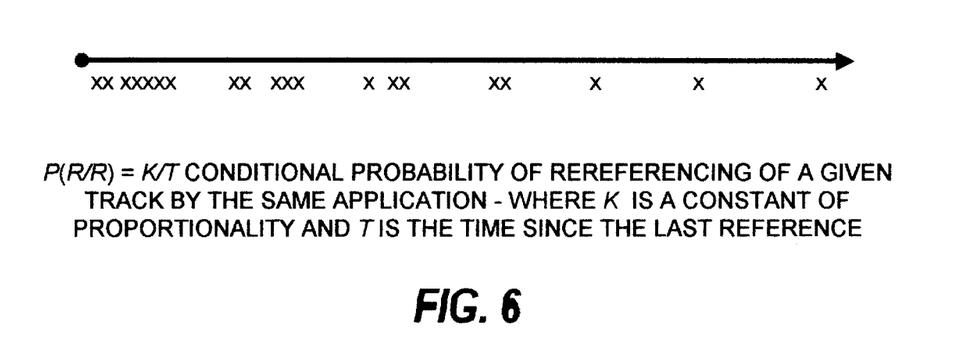
FIG. 6 shows a timeline in which the conditional probability of referencing is an inverse function of time.

Referring now to FIG. 5, there is shown a log—log plot of the inverse relation between the probability of rereferencing as an inverse function of time since the last reference. The log—log plot conveniently linearizes a hyperbolic-like function empirically observed in the referencing address patterns of a preponderance of applications accessing a disk-based storage subsystem. Another way of expressing this locality of referencing is by way of a timeline in which the conditional probability of referencing is an inverse function of time, such as is depicted in FIG. 6.

Protocol, Finite State Machine, and Additional Considerations

Figure 2B:
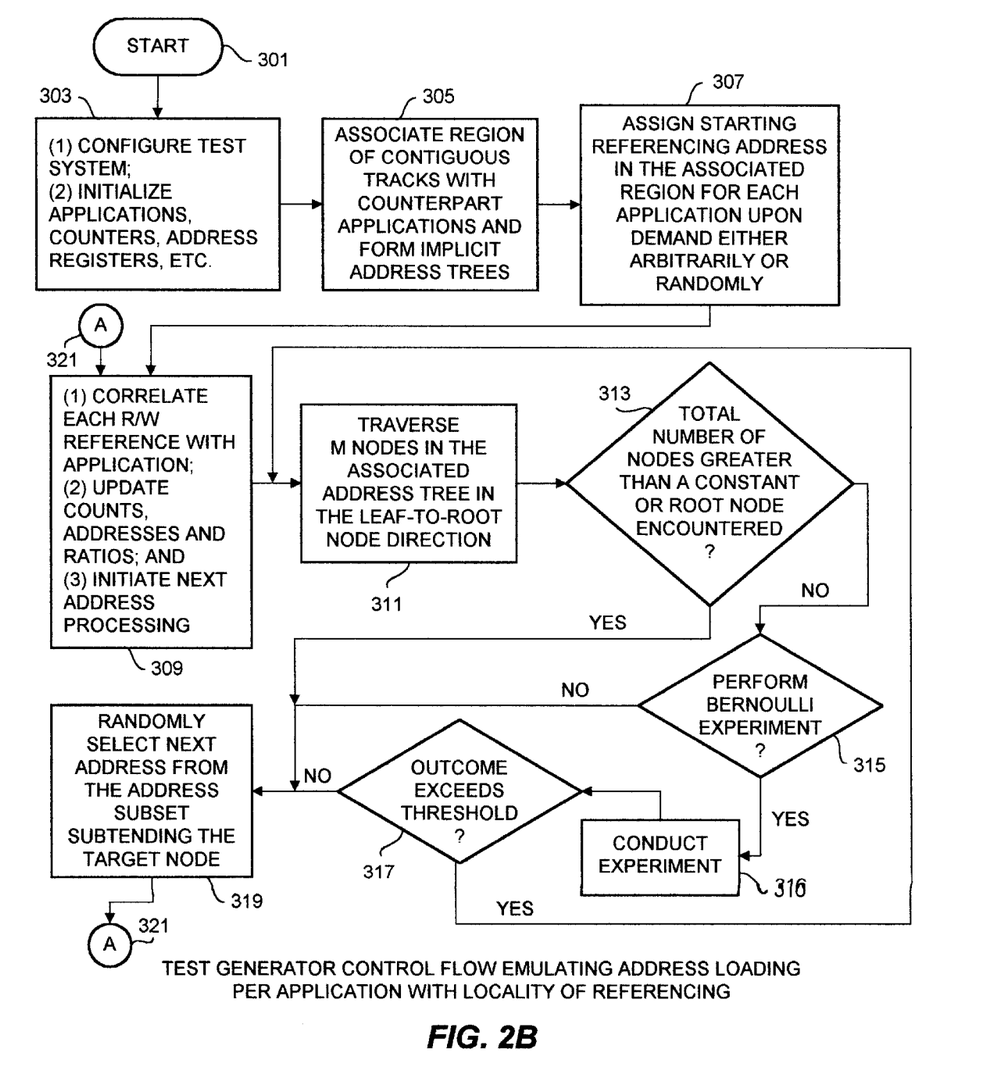
FIG. 2B shows a test generator flow of control emulating address loading per application with locality of referencing.

Referring now to FIG. 2B, there is shown a test generator flow of control emulating address loading per application with locality of referencing. The protocol is initiated or invoked at step 301. Next, the protocol configures the test system, such as that set out in FIG. 2A, and initializes the test hardware in step 303, Configuration and initialization usually include mapping all hardware, device driver identities, early binding of selective resources, and concurrent executing applications, and initializing counters and registers in test generator 219 and subsystem 221 under test. This is followed in step 305 by associating regions of contiguous tracks across the devices with counterpart applications. For example:

| Application Executing on Processor 201 | Disk Track Address |
| --- | --- |
| Referencing Application A | FIG. 3/371 DASD 1 - tracks 000, 001, . . . , 127 |
| Referencing Application B | FIG. 3/373 DASD 1 - tracks 512, 513, . . . , 1023 |
| Referencing Application C | FIG. 3/375 DASD 2 - tracks 256, 257, . . . , 511 |

Referring again to FIG. 2B, in step 307 a starting track address is assigned to each application within its region. This can be done arbitrarily or as a random selection. If it is done arbitrarily, there should not be any significant bias to the random walk function outcomes. This devolves from the fact that referencing should occur at very high rates and cumulatively reduce any starting address bias within a region to insignificance.

Step 309 is the first step of the main sequence of the protocol and correlates tracking activity. That is, an address trace is maintained for each process initialized by the starting address in the associated region. Each time a reference (read or write request) from application A, B, or C is generated, a branch is made to the associated address trace to copy into a register the immediately preceding track address. Assume application B was requesting a read operation and its preceding reference request was to track 010. This preceding track address is used to index into a list representation of a tree graph of the region of contiguous track addresses. The associated node is 01X as shown in FIG. 4.

It should be appreciated by the skilled artisan that finite state machines and their software emulators are well known and used for the purpose of traversing a graph. Such an abstract machine comprises a present state and next state definition and a specification of the events, conditions, or outcomes for moving from node to node.

Returning to the example and FIG. 2B, the first test as represented by step 313 is whether the sum of the traverses or nodes has either reached a maximum or has encountered the root node. If such a maximum or root node has been reached, then the protocol branches immediately to random address selection step 319. If such a maximum has not been attained, then the protocol moves to step 315.

At this point, the protocol step 315 is graphed as a choice. This is meant as a design choice. That is, the next move is either to conduct a Bernoulli experiment in step 316 or go directly to step 315. Conducting a Bernoulli experiment randomizes the walk and permits an occasionally longer walk to balance out the occasional short walks. Further, it permits introduction of subtle statistical variations by biasing the outcomes of the experiment within the random walk/rereferencing framework. The Bernoulli experiment in step 316 can be implemented simply by obtaining a number from a quasi- or pseudo-random number generator within a range and comparing the number against a threshold, as in step 317. If the number exceeds the threshold, then the traverse returns to step 311. Otherwise, the protocol branches to step 319. Again, from a design view, the outcomes could be reversed and there would be no loss of applicability.

It should be noted that step 311 represents an initial traverse from a leaf to a first parent or connecting node. In this embodiment, this initial traverse of M nodes is set to M=1. However, as a matter of design choice, M could be set to a higher number. Another variation would be to set M≧1 on a first pass through the protocol and M=1 on all subsequent passes until the address selection is resolved.

Figure 2C:
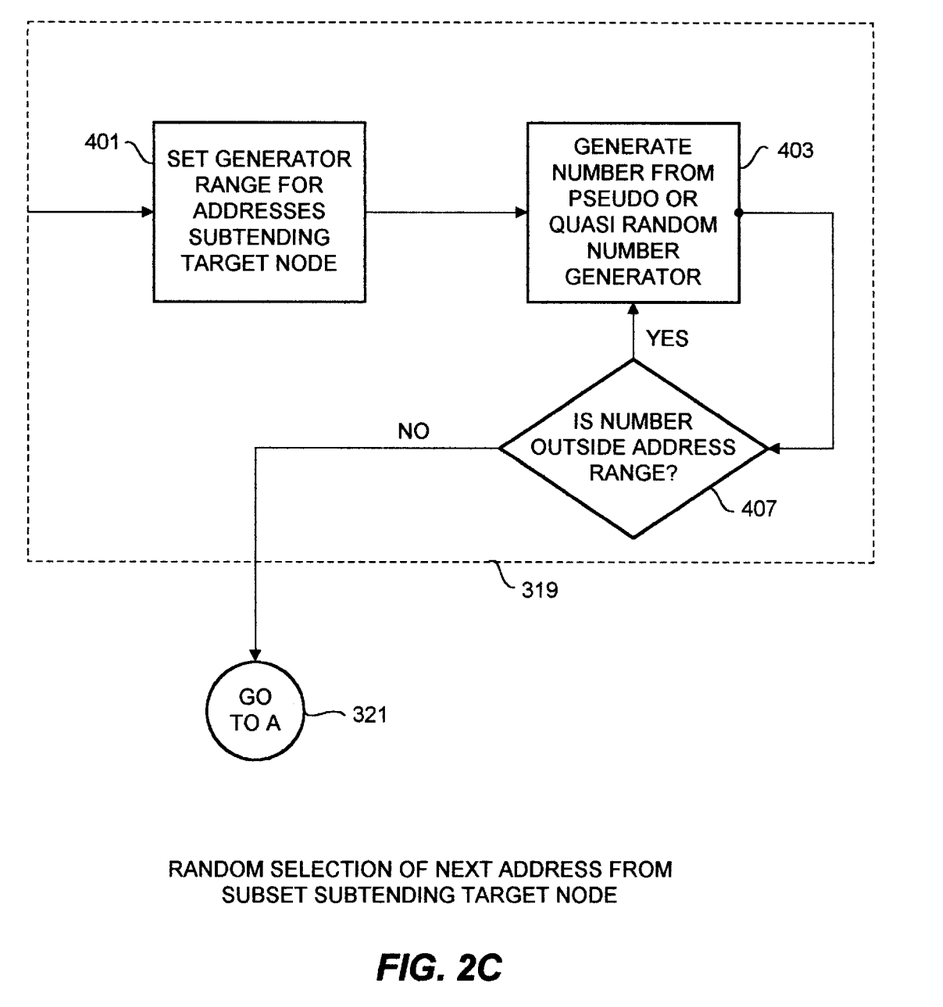
FIG. 2C sets out the control flow for the random selection of an address from an address subset subtending the target node selected in the control flow in FIG. 2B.

Pseudo-random number generation of a sequence $\{r_1, r_2, r_3, \ldots, r_k\}$ in the range [0, G−1] can be hardware or software implemented using the linear congruent method (LCM). The LCM involves multiplying a previous random number $r_{I-1}$ by a constant "a", adding another constant "c", taking the modulus M of the sum ($ar_{I-1}$+c). That is, $r_I=(ar_{I-1}+c)$ mod G. If, as a software subroutine, implementation c=1, a=4, G=9, and $r_1$=3, then:

$r_2=(ar_1+c)\mathrm{mod}(G)=(4\times3+1)\mathrm{mod}(9)=4$ $r_3=(4\times4+1)\mathrm{mod}(9)=8$ $r_4=(4\times8+1)\mathrm{mod}(9)=6.$ Referring again to FIG. 2B, the protocol at this juncture transplants to step 319 where a random selection must be made from the range of addresses subtending the node at which a forced branch was made to step 319. Referring now to FIG. 2C, there is shown the control flow for the random selection of an address from an address subset subtending the target node selected in the control flow in FIG. 2B. This can be implemented in several ways. One embodiment is to provide a list indexed by the node identity correlated with the subtending addresses (leaves of the address tree). The addresses constitute a range or modulo in step 401 and, with suitable values for the constants "a" and "c", the address of interest could then be determined by the linear congruent method as described above. If another method were used in which addresses outside the range could be generated in step 403, a test could be imposed as in step 407 and recycle the generator. Otherwise, the generated number would serve as the address for that reference for application B. The address would also be added to the reference trace associated with the application. Lastly, the protocol would return at point 321 to step 309 and process the next reference from the same or another application.

Extensions

One extension to the method and means of this invention is its incorporation as a separate test device capable of generating concurrent access patterns and performing event-recording results in a small and portable package. This form of packaging avoids the higher cost of tying up a large mainframe and the invocation of complex test bed facilities, such as an IMS or DB2 database or the like.

Another extension is to include a microcoded version of a suite of concurrently executed test drivers with referencing patterns constrained according to the invention and with appropriate software counting and trace function as firmware embedded in a flash memory control store within the storage subsystem under test. This would eliminate the need for a system configuration heretofore required.

While the invention has been described with respect to an illustrative embodiment thereof, it will be understood that various changes may be made in the method and means herein described without departing from the scope and teaching of the invention. Accordingly, the described embodiment is to be considered merely exemplary and the invention is not to be limited except as specified in the attached claims.

What is claimed is:

1. A method for emulating realistic access requests used in static or dynamic performance testing of a disk-based storage subsystem, said access requests being expressed in the form of disk and track commands and addresses to units of data stored or to be written onto disk and track locations in the subsystem, said subsystem being shared among a plurality of concurrently executing processes, comprising the steps of:

(a) associating a region of disk storage of a predetermines number of contiguous addressable tracks to each executing process, each region implicitly defining an ordered set, each region further constituting an implicit address tree in which the leaves are the track addresses;

(b) assigning a starting address among the track addresses in the region associated with and responsive to a first access request from each accessing process; and (c) responsive to each access request from each process completing steps (a) and (b), assigning the next address to the access request from the process as a random walk function on the tree over a traverse from an immediate predecessor address or node to an intermediate or root node and as a random selection of an address from the address subset of leaf nodes subtending the intermediate or root node, said random walk function includes performing a Bernoulli experiment, the mutually exclusive outcomes of said experiment being either (1) traversal of the tree by a predetermined number of nodes and then repeating the Bernoulli experiment, or (2) randomly selecting an address from the set subtending the immediate node.

2. A method for emulating realistic access requests used in static or dynamic performance testing of a disk-based storage subsystem, said access requests being expressed in the form of disk and track commands and addresses to units of data stored or to be written onto disk and track locations in the subsystem, said subsystem being shared among a plurality of concurrently executing processes, comprising the steps of:

(a) associating a nonexclusive region of disk storage of a predetermined number of contiguous addressable tracks to each executing process, each region implicitly defining an ordered set, each region further constituting an implicit address tree in which the leaves are the track addresses;

(b) assigning a starting address L among the track addresses in the region associated with and responsive to a first access request from each accessing process; and (c) responsive to each access request from each process completing steps (a) and (b), assigning the next address to the access request from the process as a random walk function starting from an immediate predecessor address and including the steps of:
  (1) traversing one or more nodes to an intermediate or root node in the tree, each traverse including at least one node and performing a Bernoulli experiment having one of two outcomes, said traverse and experiment repeating for at least one more node as the target node upon the occurrence of an outcome of a first kind; and
  (2) randomly selecting an address from the address subset subtending the intermediate or root node upon the occurrence of an outcome of a second kind responsive to performing the Bernoulli experiment.

3. The method according to claim 2, wherein each region includes $2^N$ tracks, and further wherein each track L in the region is binarily addressable in the relative address range $0 \leq L \leq 2^N - 1$, and still further wherein the implicit address tree forms a binary address tree.

4. The method according to claim 2, wherein the step (c) of assigning the next address as a random walk function includes the step of:
  (c1) traversing at least a first node subtended by the immediate predecessor address and performing a Bernoulli experiment having one of two possible outcomes, and
    (c1a) in the event of the first outcome, traversing yet another superior node and performing the Bernoulli experiment, said node-to-node traverse being repeatable until a second outcome occurs, a predetermined number of nodes have been traversed, or the root node encountered; and
    (c1b) in the event of the second outcome, randomly selecting an address from the address subset of leaf nodes subtending the node at which the Bernoulli experiment was performed.

5. The method according to claim 4, wherein the step (c1) of performing the Bernoulli experiment further includes the steps of:
  (c1a1) generating a random number lying within a predetermined range from a random number generator selected from the set consisting of a pseudo-random number generator and a quasi-random number generator; and
  (c1a2) comparing said generated number with that cf a threshold also lying with said predetermined range, said first outcome occurring in the event that comparison indicates that the generated number exceeds the threshold, said second outcome occurring in the event that comparison indicates that the generated number was equal to or less than the threshold.

6. The method according to claim 2, wherein the step (b) of assigning an arbitrary starting address includes the step of randomly selecting the starting address from among the track address in the region associated with the requesting process, and wherein the step (c) of assigning the next address as a random walk function includes the steps of assigning the next track address as a randomized function of the immediately preceding track address.

7. The method according to claim 2, wherein said steps further comprise writing at least one unit of data to each track in the assigned region and randomly selecting one unit of data from those stored on the track.

8. A method for emulating access requests for use in static or dynamic performance testing of a disk storage subsystem, said access requests being expressed in the form of disk and track commands and addresses to units of data stored or to be written onto disk and track locations in the subsystem, said subsystem being shared among a plurality of concurrently executing processes communicating with said subsystem, likelihood of track or near-neighbor track rereferencing, by the same process varying inversely with the number of access requests, comprising the steps of:
  (a) associating a region of disk storage including a predetermined number of contiguous addressable tracks to each executing process, the tracks in each region defining an ordered set and implicitly constituting an address tree in which the leaves are the track addresses;
  (b) randomly selecting and assigning a starting address L from the set of addresses in the region associated with and responsive to a first access request from each accessing process; and
  (c) responsive to each access request from each process; completing steps (a) and (b), assigning the next address to the access request from the process as a random walk function starting from an immediate predecessor address and including the steps of:
    (1) traversing at least a first node subtended by the immediate predecessor address leaf node and performing a Bernoulli experiment having one of two possible outcomes;
    (2) in the event of the first outcome, traversing yet another superior node and performing the Bernoulli experiment, said node-to-node traverse being repeatable until either a second outcome occurs, a predetermined number of nodes have been traversed, or the root node encountered; and
    (3) in the event of the second outcome, randomly selecting an address from the address subset of leaf nodes subtending the node at which the Bernoulli experiment was performed.

9. The method according to claim 8, wherein each region includes $2^N$ tracks and each track L in the region is binarily addressable in the relative address range $0 \leq L \leq 2^N - 1$.

10. The method according to claim 8, wherein the step (c1) of performing the Bernoulli experiment further includes the steps of:
  (c1a1) generating a random number lying within a predetermined range according to a protocol selected from the set consisting of pseudo-random number protocol and a quasi-random number protocol; and
  (c1a2) comparing said generated number with that of a threshold also lying within said predetermined range, said first outcome being that the generated number exceeds the threshold, said second outcome being that the generated number was equal to or less than the threshold.

11. A test generator for emulating realistic access requests used in static or dynamic performance testing of a disk-based storage subsystem, said access requests being expressed in the form of disk and track commands and addresses to units of data stored or to be written onto disk and track locations in the subsystem, said subsystem being shared among a plurality of concurrently executing processes, comprising:
  a source of pseudo-random number indicia;
  a processor for executing a plurality of tasks concurrently, each task generating one or more read or write requests for units of data;
  a first logic circuit coupling said processor for associating a region of disk storage of a predetermined number of contiguous addressable tracks to each executing process, each region implicitly defining an ordered set, each region further constituting an implicit address tree in which the leaves are the track addresses;

an address register;

a second logic circuit coupling said address register, said first logic circuit, and said processor and responsive to a first access request from each accessing process for assigning an arbitrary starting address among the track addresses in ihe region associated with accessing process and writing said starting address into the register; and a third logic circuit coupling said address register, the pseudo-random number source, the processor, and the first and second logic circuits and responsive to each access request from each process for assigning the next address to the access request from the process as a random walk function on the tree over a traverse from an immediate predecessor address or node to an intermediate or root node and as a random selection of an address from the address subset of leaf nodes subtending the intermediate or root node, said random walk function includes performing a Bernoulli experiment, the mutually exclusive outcomes of said experiment being either (a) traversal of the tree by a predetermined number of nodes and then repeating the Bernoulli experiment, or (b) randomly selecting an address from the set subtending the immediate node.

12. A test generator for emulating realistic access requests used in static or dynamic performance testing of a disk-based storage subsystem, said access requests being expressed in the form of disk and track commands and addresses to units of data stored or to be written onto disk and track locations in the subsystem, said subsystem being shared among a plurality of concurrently executing processes, comprising:

a source of pseudo-random number indicia;

a processor for executing a plurality of tasks concurrently, each task generating one or more read or write requests for units of data;

a first logic circuit coupling said processor for associating a nonexclusive region of disk storage of a predetermined number of contiguous addressable tracks to each executing process, each region implicitly defining an ordered set, each region further constituting an implicit address tree in which the leaves are the track addresses;

an address register;

a second logic circuit coupling said address register, said first logic circuit, and said processor and responsive to a first access request from each accessing process for assigning an arbitrary starting address L among the track addresses in the region associated with accessing process and writing said starting address into the register; and a third logic circuit coupling said address register, the pseudo-random number source, the processor, and the first and second logic circuits and responsive to each access request from each process for assigning the next address to the access request from the process as a random walk function starting from an immediate predecessor address, said third logic circuit including:

a first arrangement for traversing a predetermined number of nodes to a target node in the tree in a leaf-to-root node direction; and a second arrangement responsive to the number source for randomly selecting an address from the address subset subtending the target node and for writing said selected address in the register.

13. The test generator according to claim 12, wherein each region includes $2^N$ tracks, and further wherein each track L in the region is binarily addressable in the relative address range $0 \leq L \leq 2^N - 1$, and still further wherein the implicit address tree forms a binary address tree.

14. An article of manufacture comprising a machine-readable memory having stored therein a plurality of processor-executable control program steps for emulating realistic access requests used in static or dynamic performance testing of a disk-based storage subsystem, said access requests being expressed in the form of disk and track commands and addresses to units of data stored or to be written onto disk and track locations in the subsystem, said subsystem being shared among a plurality of concurrently executing processes, said control program steps include:

(a) a control program step for associating a region of disk storage of a predetermined number of contiguous binarily addressable tracks to each executing process, each region implicitly defining an ordered set, each region further constituting an implicit binary address tree in which the leaves are the binary track addresses;

(b) a control program step for assigning a starting address among the track addresses in the region associated with and responsive to a first access request from each accessing process; and (c) a control program step responsive to each access request from each process completing control program steps (a) and (b), for assigning the next address to the access request from the process as a random walk function on the tree over a traverse from an immediate predecessor address or node to an intermediate or root node and as a random selection of an address from the address subset of leaf nodes subtending the intermediate or root node, said random walk function includes performing a Bernoulli experiment the mutually exclusive outcomes of said experiment being either (a) traversal of the tree by a predetermined number of nodes and then repeating the Bernoulli experiment, or (b) randomly selecting an address from the set subtending the immediate node.

* * * * *